United States Patent

Neuman et al.

[11] Patent Number: 5,942,815
[45] Date of Patent: Aug. 24, 1999

[54] PROGRAMMABLE CAPACITIVE HORN SWITCH

[75] Inventors: David Raymond Neuman, Randolph, Minn.; Roy A. Maynard, Noblesville, Ind.; Gary W. Schult, Cottage Grove, Minn.

[73] Assignee: Sheldahl, Inc., Northfield, Minn.

[21] Appl. No.: 08/943,756

[22] Filed: Oct. 3, 1997

[51] Int. Cl.⁶ .................................................. G08B 3/00
[52] U.S. Cl. ........................ 307/139; 307/119; 307/129; 307/10.1; 331/177 R; 340/384.73; 116/142 R; 200/61.54
[58] Field of Search ................................ 307/139, 125, 307/129, 10.1, 119; 331/65, 177 R; 340/530, 384.5, 384.73, 384.7, 388.1; 116/142 R; 200/61.54

[56] References Cited

U.S. PATENT DOCUMENTS

| | | |
|---|---|---|
| 3,876,977 | 4/1975 | Ladewig . |
| 4,090,092 | 5/1978 | Serrano . |
| 4,529,968 | 7/1985 | Hilsum et al. . |
| 5,338,059 | 8/1994 | Inoue et al. . |
| 5,398,962 | 3/1995 | Kropp . |
| 5,431,437 | 7/1995 | Nichols et al. . |

*Primary Examiner*—Albert W. Paladini
*Attorney, Agent, or Firm*—Merchant, Gould, Smith, Edell, Welter & Schmidt, P.A.

[57] ABSTRACT

A flexible capacitor is used in a switch circuit arrangement for activating a vehicle horn. The switch circuit arrangement includes an astable circuit having a flexible capacitor. The astable circuit generates a signal having a frequency that varies in response to force applied to the capacitor. A programmed frequency sensor activates a horn activation signal if the frequency of the signal falls below a programmed threshold.

18 Claims, 5 Drawing Sheets

PROGRAMMABLE CAPACITIVE HORN SWITCH

BACKGROUND

1. Field of the Invention

The invention generally relates to capacitive switches, and more particularly to a switch circuit arrangement having a flexible capacitor for use in a steering wheel application.

2. Background Description

An automobile horn has been traditionally used as a safety mechanism. A driver may use his horn to alert animals, pedestrians, and even other drivers as to the presence of the automobile. Given the necessity for a driver to be able to quickly activate a horn, a horn activation switch has been historically built into some portion of the steering wheel such as a touch bar, a touch pad or in the hub of the steering wheel. A relatively large area has been provided for use in activating the horn switch to make it easy to quickly activate the horn.

In response to the advent of driver's side airbags installed in steering wheel hubs, the hub integrated horn switch has become rare or the size of the horn switch has been greatly reduced. Driver's side airbags have effectively displaced horn switches from the steering wheel hub. Horn switches for many automobiles with air bags are mounted in spokes of the steering wheel or on the periphery of the hub. The present placement of horn switches often leaves drivers searching for the switches, many times finding switches only after danger has passed.

The present problems of horn switch placement have been recognized, and some manufacturers are implementing horn activation switches that are optimally mounted in the hubs of steering wheels. However, the driver's side airbag presents various problems in implementing a workable and cost-effective solution. One problem is that current single switch designs do not work reliably in the variety of steering wheels available from the major car manufacturers. It is difficult to adjust each design to accommodate a desired force for actuating the switch.

Generally, the switch is disposed between the airbag and the hub cover. The force required to actuate the switch may vary according to how the airbag is folded, the type of material used for the hub cover, and the geometry of the hub cover. Thus, a custom design may be required for different styles of steering wheels, and there may even be variations between instances of the same type of steering wheel. Additional problems may arise from differences in temperature and air pressure. The net result is increased manufacturing costs.

Therefore, it would be desirable to have a switch that overcomes the above stated problems.

SUMMARY

The present invention is generally directed to a switch circuit arrangement including a flexible capacitor for use in a steering wheel application.

Consistent with the present invention, one aspect involves a circuit arrangement configured to be coupled to a vehicle's horn subsystem. The horn activation circuit arrangement for a steering wheel includes an astable circuit for generating a first signal having a frequency and including a flexible capacitor disposed in a recess in the steering wheel for varying the frequency of the first signal in response to force applied to the flexible capacitor; and a frequency sensor coupled to the astable circuit to receive the signal and having an output port for outputting an activation signal to activate the horn if the frequency is less than a threshold frequency.

Consistent with another aspect, the frequency sensor includes a counter coupled to the astable circuit and responsive to the frequency of the signal; and a micro-controller coupled to the counter and having an output port for outputting the activation signal.

In a further aspect of the invention, the capacitor is disposed between an airbag and a cover of a hub of the steering wheel.

In another aspect of the invention, the capacitor includes a first metal layer coupled to the astable circuit; a second metal layer coupled to the astable circuit; and a compressible dielectric layer disposed between the first and second metal layers.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

BRIEF DESCRIPTION OF THE DRAWINGS

The invention may be more completely understood in consideration of the detailed description of various embodiments of the invention which follows in connection with the accompanying drawings, in which.

DETAILED DESCRIPTION

The present invention is believed to be applicable to a variety of circuit arrangements for activation of a device by application of force to an electrical switch. The invention has been found to be particularly advantageous in an application where a switch for a horn is disposed in the hub of an automobile steering wheel. While the present invention is not so limited, an appreciation of various aspects of the invention is best gained through a discussion of examples operating in such an application.

Figure 1:
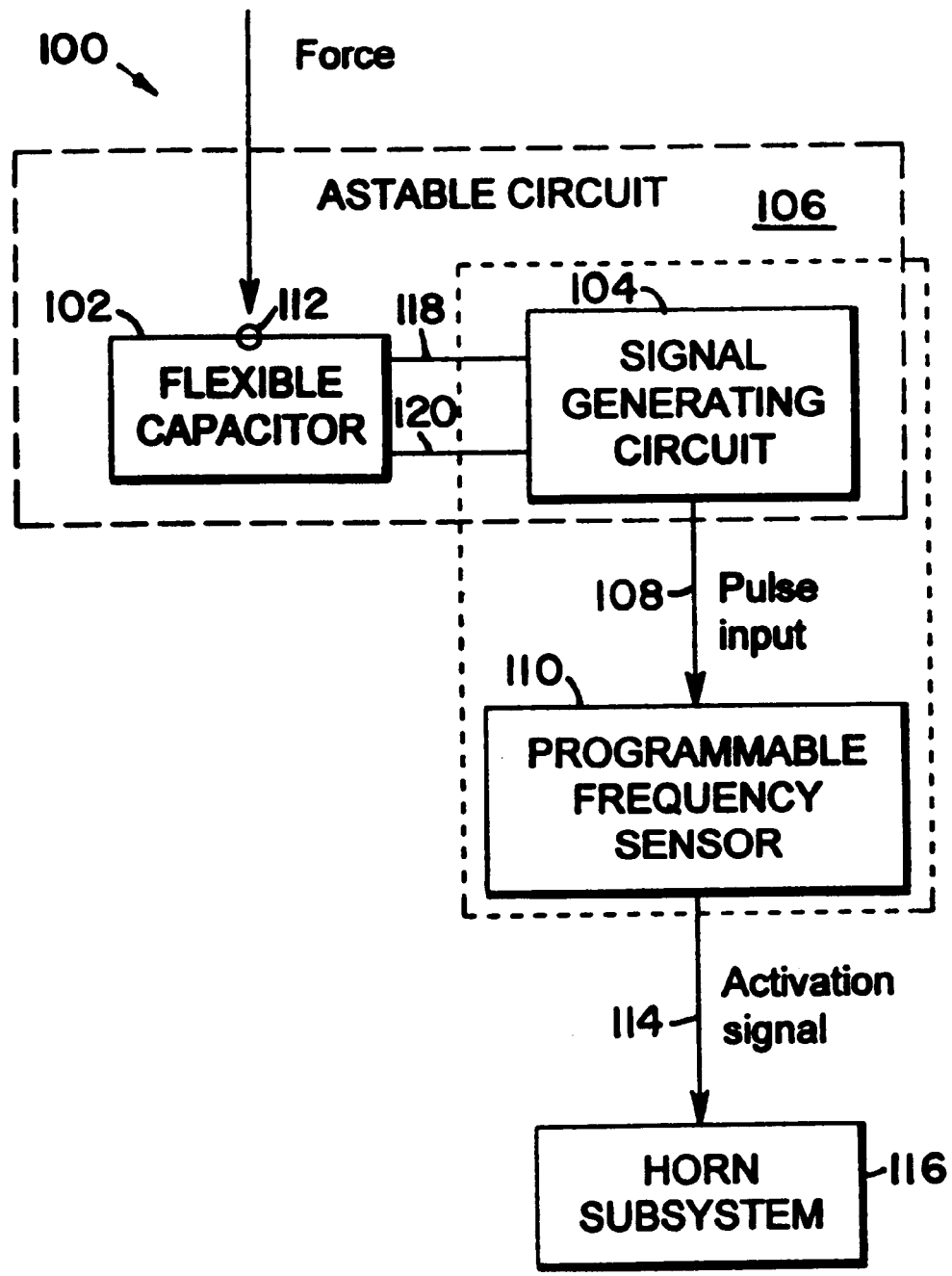
FIG. 1 is a functional block diagram of an example embodiment of a switch with a flexible capacitor.

Referring first to FIG. 1, a first example embodiment of the invention is shown. The switch 100 includes a flexible capacitor 102 coupled to signal generating circuit 104, which together form astable circuit 106. Astable circuit 106 outputs a pulse input signal on line 108 to a programmable frequency sensor 110. Programmable switch 100 is responsive to force applied at force area 112 to flexible capacitor 102 and generates an activation signal on signal line 114. The horn subsystem 116 of a vehicle responds to the activation signal by activating a horn, which is part of the horn subsystem. The horn subsystem 116 is conventional, and those skilled in the art will recognize suitable devices for providing the stated function.

Flexible capacitor 102 is electrically coupled to signal generating circuit 104 via lines 118 and 120. Signal generating circuit 104 outputs a signal whose frequency varies in response to force applied to flexible capacitor 102 at force area 112. Signal generating circuit 104 may be implemented as a resistor/capacitor network or with another circuit for generating a signal having a desired voltage level and frequency. Astable circuit 106 generates a pulse input signal on line 108 which is provided as input to the programmable frequency sensor 110. When no pressure is applied to the flexible capacitor 102, example astable circuit generates a signal having a frequency of 12 KHz. When pressure is applied to the flexible capacitor 102, the frequency of the pulse input signal on line 108 is reduced.

Programmable frequency sensor 110 is responsive to the frequency of the pulse input signal on line 108. If a the frequency of the pulse input signal falls below a programmed threshold, the activation signal on line 114 is activated and provided to the horn subsystem 116. The example programmable frequency sensor 110 is programmed to conditionally activate the activation signal on line 114 if the frequency of the pulse input signal falls below a programmed threshold.

Various embodiments are available for signal generating circuit 104 and programmable frequency sensor 110. In one embodiment, signal generating circuit 104 and programmable frequency sensor 110 may be separate devices disposed on a single or multiple circuit boards. In another embodiment, the functions of signal generating circuit 104 and programmable frequency sensor may be combined into an ASIC. Various other embodiments will be apparent to those skilled in the art.

The invention is particularly useful as an activation switch for a vehicle horn where the activation switch is disposed in the hub of the steering wheel, the hub also having an airbag. Given the variations in hub cover materials, hub cover geometry, airbag folds, and various environmental factors, the programmability of the activation switch is advantageous. Rather than generating a custom design for every style of steering wheel, manufacturers can program the activation switch based on test results for a particular steering wheel. In particular, various programmable sensors may be programmed with different thresholds which depend upon the respective desired forces to be applied to the hubs for activation of the horns.

Figure 2:
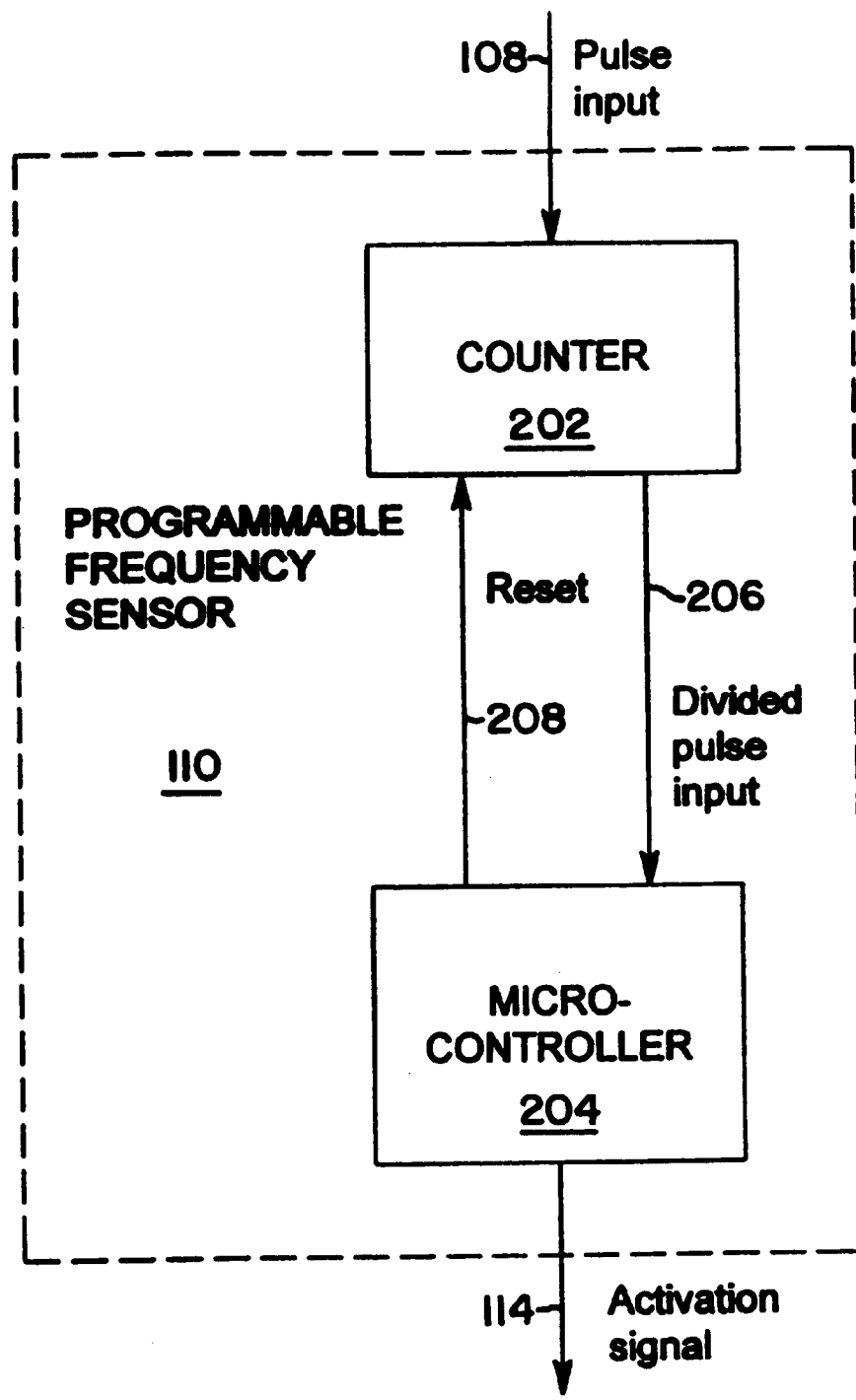
FIG. 2 is a block diagram of an example circuit arrangement for a programmable frequency sensor.

FIG. 2 is a block diagram of an example circuit arrangement for programmable sensor 110. The circuit arrangement includes counter 202 and micro-controller 204. Counter 202 receives the pulse input signal on line 108 from astable circuit 106. A divide-by-256 operation is performed on the pulse input signal by counter 202. That is, counter circuit 202 counts 256 pulses before activating the divided pulse input signal on line 206. The output of counter 202 remains at a first signal level for 256 pulses and is then set at a second signal level for the next 256 pulses. Micro-controller 204 measures the pulse width of the divided pulse input signal. If the pulse width of the divided pulse input signal is greater than a programmed threshold, the activation signal on line 114 is activated. While counter 202 implements a divide-by-256 function, those skilled in the art will recognize that other divisors may be suitable, depending upon the frequency of the pulse input from astable circuit 106 and the capabilities of micro-controller 204.

A reset signal is input to counter 202 by micro-controller 204 on signal line 208. In response to the reset signal, counter 202 resets its counter value to zero and begins counting in response to the pulse input on line 108. Counter 202 may be reset periodically by microcontroller 204 according to a desired number of pulses to count.

Both counter 202 and micro-controller 204 of the example embodiment are commercially available parts. For example, counter 202 is a CMOS 4040 ripple counter, and micro-controller 204 is a PIC 16F84 micro-controller. Those skilled in the art will recognize that various other counters and micro-controllers, as well as an ASIC, could be used within the scope of the present invention.

Micro-controller 204 is programmable by various means. A serial input port (not shown) may be used to program micro-controller 204. Alternatively, a commercially available programming module may be used.

Figure 3:
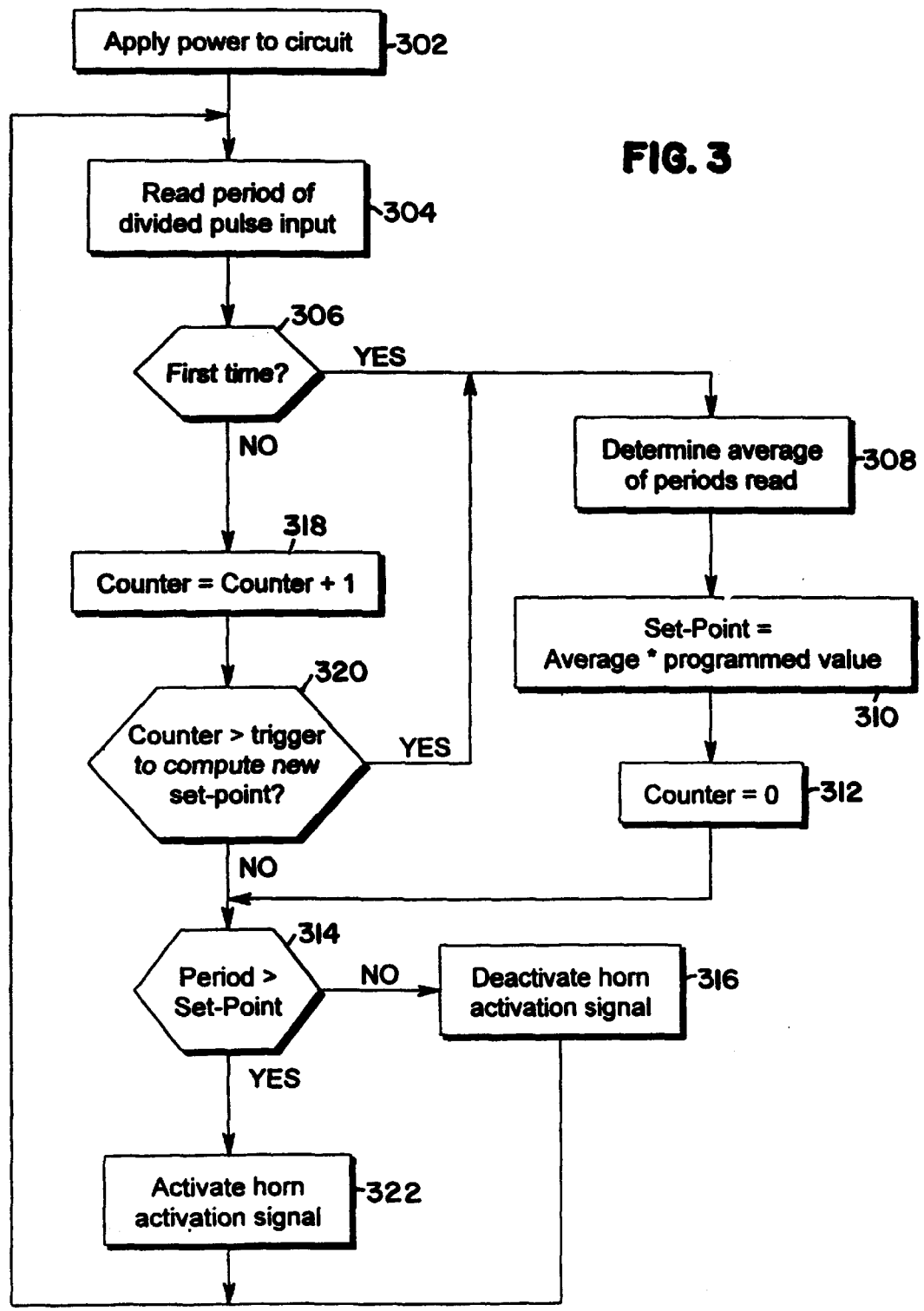
FIG. 3 is a flowchart of an example method of operation of the micro-controller for activating and deactivating a horn activation signal.

FIG. 3 is a flowchart of an example method of operation of micro-controller 204 for activating and deactivating the activation signal on line 114. The example method tests whether the period of the divided pulse input signal on line 206 is greater than a set-point. If so, the horn activation signal is activated. Otherwise, the horn activation signal is deactivated. To account of fluctuations in environmental conditions, the algorithm averages the periods read and the set-point is adjusted accordingly.

At step 302, power is applied to micro-controller 204, which results in initiation of the illustrated processing. The period of the divided pulse input signal on line 206 is read at step 304. Decision step 306 tests whether this is the first time that the period of the pulse was read since initial application of power to micro-controller. An initial set-point must be established the first time a period is read. Thus, decision step 306 directs control to step 308.

Step 308 determines an average of the read values of the periods. The first time an a period is read and step 308 is performed, the average is the value read. Once a number of periods have been read and stored, for example, 10 periods, a more meaningful average can be determined.

Step 310 adjusts the set-point by multiplying the average obtained at step 108 by a pre-programmed value, for example, 1.5. Note that the multiplier, in this example, 1.5, may be obtained by experimentation. Step 312 initializes a counter to the value 0, and directs control to decision step 314.

Decision step 314 tests whether the period read at step 304 is greater than the set-point. Recall that the first time micro-controller 204 reads a period, the set-point is initialized to the product of the period and the programmed value, e.g., 1.5. Thus, for a first time reading, the period will be less than the set-point and control is directed to step 316 where the horn activation signal is deactivated. Control is then directed to step 304 where the micro-controller reads the period of another divided pulse input signal on line 206.

Decision step 306, detecting that more than one period has been read, directs control to step 318. Step 318 increments a counter and directs processing to decision step 320. A new set-point is computed after a predetermined number of reads of the periods of the divided pulse input signal on line 206. Thus, if the counter is greater than a trigger value to compute a new set-point, for example 65,500, then control is directed to step 308. Recall that step 308 computes an average of periods read. In an example embodiment, the average is computed based on ten periods, where each of the ten periods is the period most recently read when control is directed to step 308. It should be noted, however, that if a new period is read which is greater than the set-point and it is time to compute a new set-point, the new period is not used as one of the ten most recent periods. Such a situation may arise, for example, if the horn is being pressed when it is time to compute a new set-point. The new period which is greater than the set-point is not used because it would undesirably raise the set-point.

Decision step 314 directs control to step 322 if the period read at step 304 is greater than the set-point. Step 322 activates the horn activation signal and directs control to step 304 to take another reading of the period.

Figure 4:
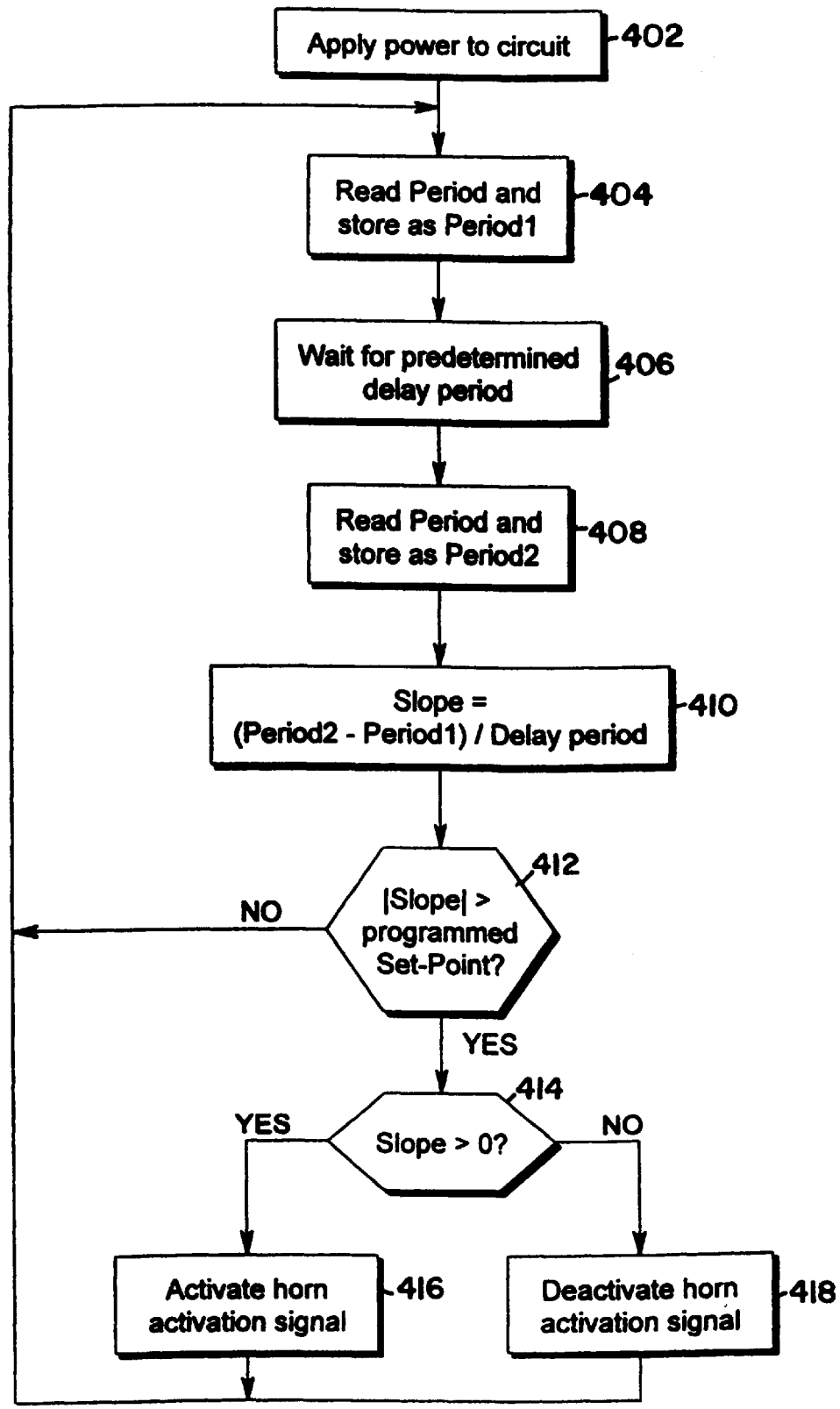
FIG. 4 is a flowchart of a second example method of the micro-controller for activating and deactivating the horn activation signal.

FIG. 4 is a flowchart of a second example method performed by micro-controller 204 for activating and deactivating the horn activation signal on line 114. Conceptually, the method of FIG. 4 uses the rate of change of the frequency of the pulse input signal from astable circuit 106 to determine whether to activate the horn activation signal. The method of FIG. 4 addresses the impact of environmental factors on activating the horn signal in a way which is different from the method of FIG. 3. Because changes in environmental factors such as air pressure, temperature, and other factors are likely to occur relatively slowly, rates of change in the operating frequency of astable circuit 106 that are caused by environmental changes are likely to be relatively small. Therefore, a relatively fast rate of change in the operating frequency of astable circuit 106 is indicative of a desired horn activation force applied at force area 112.

At step 402, power is applied to micro-controller 204, which results in initiation of the illustrated processing. The period of the divided pulse input signal on line 206 is read at step 404 and stored as Period1. Step 406 directs micro-controller 204 to wait for a predetermined delay period of time before continuing processing at step 408. At step 408, micro-controller 204 reads a second period of the divided pulse input signal on line 206 and stores the second period as Period2.

Step 410 computes the change in period per unit time as slope=(Period2−Period1)/delay period. If the absolute value of the slope is less than or equal to a predetermined set-point, decision step directs control to step 404. Otherwise, control is directed to decision step 414. Decision step 414 tests whether the horn activation signal should be activated or deactivated. If the slope is less than or equal to zero, control is directed to step 416 where the horn activation signal is activated. Otherwise control is directed to step 418 where the horn activation signal is deactivated. For both of steps 416 and 418, subsequent processing is directed to step 404.

Figure 5:
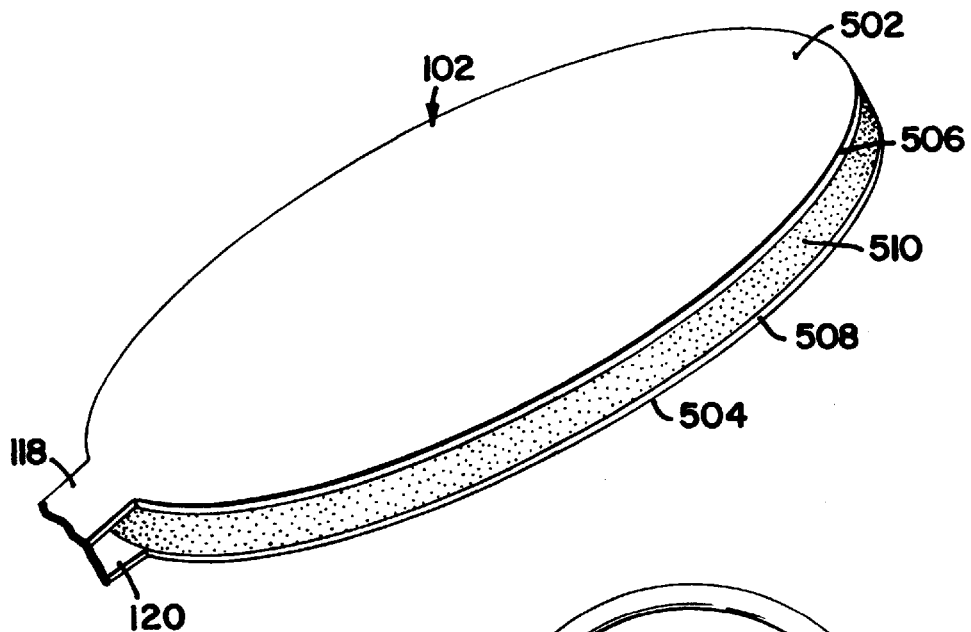
FIG. 5 is pictorial diagram of an example embodiment of the flexible capacitor.

FIG. 5 is pictorial diagram of an example embodiment of flexible capacitor 102. Flexible capacitor includes a first flexible metal surface 502 and a second flexible metal surface 504. Metal surface 502 is laminated to a polyester film 506, and metal surface 504 is laminated to polyester film 508. Polyester films 506 and 508 are 1 mil films, and metal surfaces 502 and 504 are 1-ounce copper foil, for example.

Polyester films 506, 508 are bonded in a conventional manner to foam layer 510. Foam layer 510 is polyether polyurethane, for example. Those skilled in the art will recognize that this is but one embodiment of a flexible capacitor. It may be desirable to bond metal surfaces 502 and 504 to foam layer 510 instead of bonding the polyester films 506 and 508. Conventional techniques are used to manufacture capacitor 102.

Various other embodiments of flexible capacitors will be recognized by those skilled in the art. For example, flexible capacitor 102 may be formed with a flexible substrate with metal conductors deposited thereon. To complete the capacitor, a foam layer, on which a metal layer is bonded, is disposed on the flexible substrate, with the metal layer separated from the metal conductors by the foam layer.

Figure 6:
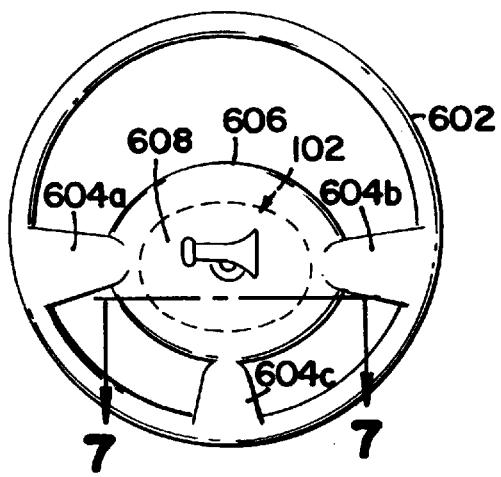
FIG. 6 is a top view of an example steering wheel in which the present invention may be used.

FIG. 6 is a top view of an example steering wheel in which the present invention may be used. The steering wheel includes a wheel portion 602 and spoke portions 604a, 604b, and 604c mounted on the wheel portion 602 and extending inward for support of hub portion 606. Wheel portion 602 and spoke portions 604a–c are conventionally made, and those skilled in the art will recognize other configurations for supporting hub portion 606, such as more or fewer spokes.

Capacitor 102, as shown by dashed line 102, is disposed within hub portion 606. Force applied at the outer surface 608 of hub 606 to capacitor 102 activates horn subsystem 116.

Figure 7:
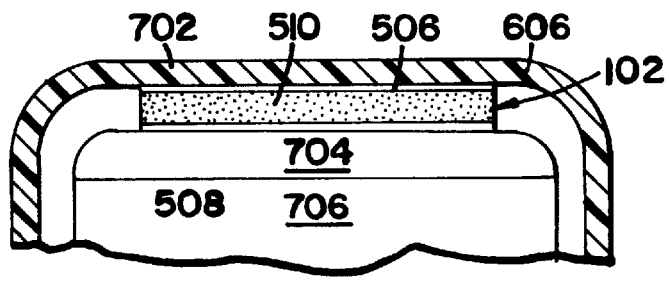
FIG. 7 is a partial cross-sectional view of a steering wheel hub taken in the direction of arrows 7 of FIG. 6.

FIG. 7 is a partial cross-sectional view of hub 606 taken in the direction of arrows 7 of FIG. 6. Hub 606 includes an outer cover 702 that is molded to accommodate airbag 704, inflator canister 706, and flexible capacitor 102. Cover 702 is conventionally made except that it is molded to accommodate flexible capacitor 102 in addition to the airbag 74 and inflator canister 706.

In the example embodiment of FIG. 7, capacitor 102 is held in place by the contour of cover 702 and airbag 704. Those skilled in the art will recognize other configurations for mounting capacitor 102 in hub 606. For example, a backing plate may be disposed between airbag 704 and capacitor 102 and secured to cover 702 for maintaining proper placement of capacitor 102 within cover 702.

Capacitor 102 in the embodiment of FIG. 7, essentially lies in one plane. However, because it is flexible, capacitor 102 can be folded around corners and assume various shapes depending upon the shape of cover 702 and airbag 704.

Placement of signal generating circuit 104 and programmable frequency sensor 110 depends upon the space available within cover 702 and how the circuits are implemented. For example, if signal generating circuit 104 and programmable frequency sensor 110 are implemented as an ASIC, it may be feasible to attach the ASIC to a metal surface 502, 504 of capacitor 102. In other embodiments, which require more space than an ASIC, the signal generating circuit 104 and programmable frequency sensor 110 may be mounted elsewhere within cover 702 as space permits.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A horn activation circuit arrangement for a steering wheel, comprising:

an astable circuit for generating a first signal having a frequency and including
  a flexible capacitor disposed in a recess in the steering wheel for varying the frequency of the first signal in response to force applied to the flexible capacitor;
a frequency sensor coupled to the astable circuit to receive the first signal and having an output port for outputting an activation signal to activate the horn if the frequency is less than a threshold frequency.

2. The circuit arrangement of claim 1, wherein the frequency sensor comprises:

a counter coupled to the astable circuit and responsive to the frequency of the signal; and a micro-controller coupled to the counter and having an output port for outputting the activation signal.

3. The circuit arrangement of claim 2, wherein the counter outputs a second signal having a pulse width proportional to the frequency of the first signal, the micro-controller being responsive to the pulse width of the second signal.

4. The circuit arrangement of claim 3, wherein the micro-controller includes:

means for reading a period of the second signal from the counter;

means for establishing an average period of the second signal from the counter;

means for establishing a threshold based on the average period; and means for activating the activation signal if the period is greater than the threshold.

5. The circuit arrangement of claim 4, wherein the means for establishing a threshold includes means for multiplying the average period by a predetermined multiplier.

6. The circuit arrangement of claim 3, wherein the micro-controller includes:

means for reading a first period of the second signal from the counter;

means for reading a second period of the second signal from the counter; and means for activating the activation signal if a rate of change from the first period to the second period is greater than a predetermined threshold.

7. The circuit arrangement of claim 1, wherein the capacitor includes:

a first metal layer coupled to the astable circuit;

a second metal layer coupled to the astable circuit; and a compressible dielectric layer disposed between the first and second metal layers.

8. The circuit arrangement of claim 7, further comprising:

a first polyester layer bonded to the first metal layer and bonded to the dielectric layer; and a second polyester layer bonded to the second metal layer and bonded to the dielectric layer.

9. The circuit arrangement of claim 7, wherein the dielectric layer is polyether polyurethane foam.

10. The circuit arrangement of claim 1, wherein the steering wheel has a hub having a recess formed by a cover and an airbag disposed in the recess, the capacitor disposed between the airbag and the cover.

11. A horn activation circuit arrangement for a steering wheel, the steering wheel having a hub with a recess formed by a cover and an airbag disposed in the recess, comprising:

an astable circuit for generating a first signal having a frequency, the astable circuit including a flexible capacitor disposed in the recess between the airbag and the cover for varying the frequency of the first signal in response to force applied to the flexible capacitor;

a counter coupled to the astable circuit and responsive to the frequency of the first signal; and a micro-controller coupled to the counter and having an output port for outputting an activation signal.

12. The circuit arrangement of claim 11, wherein the counter outputs a second signal having a pulse width proportional to the frequency of the first signal, the micro-controller being responsive to the pulse width of the second signal.

13. The circuit arrangement of claim 12, wherein the micro-controller includes:

means for reading a period of the second signal from the counter;

means for establishing an average period of the second signal from the counter;

means for establishing a threshold based on the average period; and means for activating the activation signal if the period is greater than the threshold.

14. The circuit arrangement of claim 12, wherein the micro-controller includes:

means for reading a first period of the second signal from the counter;

means for reading a second period of the second signal from the counter; and means for activating the activation signal if a rate of change from the first period to the second period is greater than a predetermined threshold.

15. The circuit arrangement of claim 11, wherein the capacitor includes:

a first metal layer coupled to the astable circuit;

a second metal layer coupled to the astable circuit; and a compressible dielectric layer disposed between the first and second metal layers.

16. A method for activating a vehicle horn, comprising the steps of:

applying a force to a flexible capacitor in an astable circuit sensing a change in frequency of a first signal output from the astable circuit in response to the force; and activating the vehicle horn if the frequency is less than a first predetermined threshold.

17. The method of claim 16, wherein the sensing step includes the steps of dividing the frequency of the first signal by a predetermined value and generating a second signal; and obtaining a period of the second signal; and the activating step includes the step of activating the vehicle horn if the period of the second signal is greater than a second predetermined threshold.

18. The method of claim 16, wherein the sensing step includes the steps of dividing the frequency of the first signal by a predetermined value and generating a second signal; and obtaining a first period of the second signal; and obtaining a second period of the second signal; and the activating step includes the step of activating the vehicle horn if a rate of change from the first period to the second period is greater than a predetermined threshold.

* * * * *

UNITED STATES PATENT AND TRADEMARK OFFICE
CERTIFICATE OF CORRECTION

PATENT NO.   : 5,942,815　　　　　　　　　　　　　　　　　　　　　　Page 1 of 1
DATED        : August 24, 1999
INVENTOR(S)  : Neuman et al.

It is certified that error appears in the above-identified patent and that said Letters Patent is hereby corrected as shown below:

Title Page, item [56] References Cited, U.S. Patent Documents: insert the following in appropriate order:

-- 3,886,473    5/1975     Heyck
   4,954,805    9/1990     Buyak
   5,266,921    11/1993    Wilson
   5,293,149    3/1994     Wilson
   5,463,258    10/1995    Filion et al.--

Signed and Sealed this

Third Day of July, 2001

*Attest:*

*Attesting Officer*　　　　　NICHOLAS P. GODICI
　　　　　　　　　　　*Acting Director of the United States Patent and Trademark Office*